United States Patent
Oldenkamp

(10) Patent No.: US 9,124,183 B2
(45) Date of Patent: Sep. 1, 2015

(54) POWER INVERTER FOR FEEDING ELECTRIC ENERGY FROM A DC POWER GENERATOR INTO AN AC GRID WITH TWO POWER LINES

(71) Applicant: SMA Solar Technology AG, Niestetal (DE)

(72) Inventor: Hendrik Oldenkamp, The Hague (NL)

(73) Assignee: SMA Solar Technology AG, Niestetal (DE)

( * ) Notice: Subject to any disclaimer, the term of this patent is extended or adjusted under 35 U.S.C. 154(b) by 128 days.

(21) Appl. No.: 13/888,795

(22) Filed: May 7, 2013

(65) Prior Publication Data

US 2013/0242616 A1 Sep. 19, 2013

Related U.S. Application Data

(63) Continuation of application No. PCT/EP2011/070011, filed on Nov. 14, 2011.

(30) Foreign Application Priority Data

Nov. 12, 2010 (WO) ................. PCT/EP2010/067355

(51) Int. Cl.
*H02M 3/335* (2006.01)
*H02M 7/48* (2006.01)
*H02J 3/38* (2006.01)

(52) U.S. Cl.
CPC ........... *H02M 3/33507* (2013.01); *H02J 3/383* (2013.01); *H02M 3/335* (2013.01); *H02M 7/4807* (2013.01); *Y02E 10/563* (2013.01)

(58) Field of Classification Search
CPC .......................... H02M 3/335; H02M 3/33507
USPC .................................. 363/16, 17, 21.02, 31–41
See application file for complete search history.

(56) References Cited

U.S. PATENT DOCUMENTS

4,628,394 A 12/1986 Crosby et al.
5,587,892 A 12/1996 Barrett
(Continued)

FOREIGN PATENT DOCUMENTS

DE 4446779 A1 6/1996
DE 202006008936 A1 8/2006
(Continued)

OTHER PUBLICATIONS

DE102005023290_Translation.*
(Continued)

*Primary Examiner* — Timothy J Dole
*Assistant Examiner* — Ishrat Jamali
(74) *Attorney, Agent, or Firm* — Eschweiler & Associates, LLC

(57) ABSTRACT

A power inverter includes two input terminals, two output terminals and a resonant converter that includes a high frequency transformer having a primary winding and a secondary winding, at least one high frequency switched semiconductor power switch that connects one end of the primary winding of the high frequency transformer to one of the input terminals to provide a current path through the primary winding to the other one of the input terminals. The power inverter further includes a resonant series circuit having an inductance and a capacitance, and a high frequency rectifier that rectifies a current through the secondary winding, two output lines, and an output converter connected between the output lines of the high frequency rectifier and the two output terminals.

36 Claims, 8 Drawing Sheets

(56) References Cited

U.S. PATENT DOCUMENTS

| | | | |
|---|---|---|---|
| 6,005,304 | A | 12/1999 | Seelig |
| 7,746,669 | B2 | 6/2010 | Falk |
| 8,053,930 | B2 | 11/2011 | Cramer et al. |
| 8,373,308 | B2 | 2/2013 | Cramer et al. |
| 2003/0205990 | A1* | 11/2003 | Wittenbreder, Jr. ............ 323/222 |
| 2008/0055941 | A1 | 3/2008 | Victor et al. |
| 2008/0192510 | A1 | 8/2008 | Falk |
| 2008/0247194 | A1 | 10/2008 | Ying et al. |
| 2009/0154812 | A1 | 6/2009 | Schmitt |
| 2011/0267844 | A1* | 11/2011 | He et al. ..................... 363/21.02 |
| 2011/0273017 | A1 | 11/2011 | Borup et al. |
| 2012/0014143 | A1* | 1/2012 | Schueneman ................... 363/40 |
| 2012/0106210 | A1* | 5/2012 | Xu et al. ......................... 363/37 |

FOREIGN PATENT DOCUMENTS

| | | |
|---|---|---|
| DE | 102005023290 A1 | 11/2006 |
| DE | 102005023291 A1 | 11/2006 |
| EP | 2136449 A1 | 12/2009 |
| JP | 2006114801 A | 4/2006 |
| WO | 2010051812 A1 | 5/2010 |
| WO | 2010069620 A1 | 6/2010 |

OTHER PUBLICATIONS

Mammano, Bob. "Fixed-Frequency Resonant-Switched Pulse Width Modulation with Phase-Shifted Control." Unitrode Corporation. Published in Sep. 1991. 9 Pages.

International Search Report & Written Opinion of the International Search Authority dated Jun. 20, 2012 for International application No. PCT/EP2011/070011. 20 Pages.

International Search Report dated Sep. 8, 2011 for International application No. PCT/EP2010/067355. 6 Pages.

\* cited by examiner

POWER INVERTER FOR FEEDING ELECTRIC ENERGY FROM A DC POWER GENERATOR INTO AN AC GRID WITH TWO POWER LINES

REFERENCE TO RELATED APPLICATIONS

This application is a continuation of International application number PCT/EP2011/070011 filed on Nov. 14, 2011, which claims priority to International application number PCT/EP2010/067355, filed on Nov. 12, 2010.

FIELD

The present disclosure generally relates to a power inverter for feeding electric energy from a DC power generator into an AC grid with two-power lines. Further, the present disclosure relates to a method of operating such a power inverter.

BACKGROUND

In some known power inverters for feeding electric energy from a DC power generator into an AC grid with two-power lines, the power inverter comprises a DC/DC converter for matching the output voltage of the power generator to the grid, and a DC/AC output converter for actually feeding the electric power from the DC power generator into the AC grid.

In such known power inverters the DC/DC converter can be a converter including a high frequency transformer comprising a primary winding and a secondary winding. Such a transformer generally provides for a galvanic isolation of the secondary or output side from the primary or input side of the power inverter. A DC/DC converter including a high frequency transformer further comprises at least one high frequency switched semiconductor power switch that, in its closed state, connects one end of the primary winding of the high frequency transformer to one of the input terminals of the power inverter for providing a current path through the primary winding to the other one of the input terminals. The alternating current through the primary winding may also be provided by any type of inverter bridge connected between the input terminals of the power inverter.

The current through the secondary winding of the high frequency transformer is rectified by a high frequency rectifier typically comprising diodes arranged as a rectifier bridge, and a filter capacitor connected between output lines of the high frequency rectifier.

An interesting sub-class of DC/DC converters used in known power inverters are resonant or quasi-resonant converters, which comprise a resonant circuit. Such a resonant circuit allows for zero voltage and/or zero current switching of the semiconductor power switches providing the alternating current through the primary winding of the high frequency transformer. The resonant circuit may be provided on the primary side or on the secondary side of the high frequency transformer, and it can be a resonant parallel or series circuit.

Bob Mammano and Jeff Putsch: Fix-Frequency, Resonant-Switched Pulse Width Modulation with Phase-Shifted Control (http://server.oersted.dtu.dk/ftp/database/Data_CDs/component_data/Unitrode_seminars/se_m800/slup096.pdf) disclose a resonant-switched DC/DC converter comprising two half bridges connected between DC input terminals, each half bridge comprising two semiconductor switches and a center connected to one respective end of a primary winding of a high frequency transformer. The ends of the secondary winding of the high frequency transformer are each connected to a rectifier diode. One end of a filter circuit comprising a series inductor and an output capacitor is connected to a joint output of both rectifier diodes, and its other end is connected to a center tap of the secondary winding. The semiconductor power switches of each half bridge at the primary side of the high frequency transformer are controlled by complementary high frequency signals of 50% duty cycle. Thus, at any time at least one of the semiconductor switches of each half bridge is closed except for a dead time during which the parallel resonant transition occurs. If the semiconductor switches of the two half bridges connected to the same input terminal are closed at the same time, the primary winding of the high frequency transformer is short-circuited via these two semiconductor power switches. Only if just one of these switches is closed whereas the other is open, a current between the input terminals flows through the primary winding of the high frequency transformer. These on-times of the primary side of the high frequency transformer are defined by a phase-offset or phase-shift between the high frequency signals applied to both half bridges. The length of the on-times is defined with conventional PWM and controls the power delivered to the load. Switching of the semiconductor power switches is done at zero voltage.

Both zero voltage switching and its dual equivalent, zero current switching, provide for very low switching losses. However, in zero current switching, it is not possible to use pulse width modulation as a current shaping means with high efficiency. Only a modulation of the repetition rate of the pulses is available, as the pulse widths are determined by the zero current switching criterion.

The DC/AC converters at the output side of some known power inverters are inverter bridges with high frequency switched semiconductor power switches for forming a desired sine shape of the currents fed into the AC grid. Some other known power inverters, however, comprise a line-commutated converter at their output end, the switching elements of which are only controlled by the voltages of a connected AC grid, and are, thus, only switching at the grid frequency. As a result, these DC/AC converters at the output side are unable to provide a sine shape of the current fed into the AC grid, and any current shaping has to be done upstream of the line-commutated converter.

Some photovoltaic modules show a premature degradation in use if not permanently operated at a negative or positive electric potential with regard to electric ground. Further, operating photovoltaic modules at a defined negative or positive electric potential could be used for ground fault detection. Thus, some efforts are made to provide a voltage offset for the input terminals of a power inverter for feeding electric energy from such photovoltaic generators into an AC grid.

Some known power inverters require particular attention during their startup, as dangerously high currents may flow as long as buffer capacitors are not yet loaded to provide a sufficient counter voltage. On the other hand, electric loads present on buffer capacitors in operation of some known power inverters pose a danger when terminating the operation of known power inverters, even if all active parts of the power inverters have been inactive for some time and even if the power inverter has already been disconnected from the grid for some time.

Some regulations, like those in the US, require a galvanic isolation from the public power grid for any power generator from which electric power is fed into the public power grid.

A power inverter for feeding electric energy from a DC power generator into an AC power grid with two-power lines is known from DE 10 2005 023 290 A1. This power inverter is a bi-directional battery inverter and comprises a high frequency transformer. The high frequency transformer and a resonant capacity connected to the secondary winding of the high frequency transformer form a resonant series circuit. The primary winding of the transformer has a center tap and is connected to the battery via a center point circuitry with semiconductor switches. The resonant series circuit is connected to a rectifier. The rectifier is connected to a boost converter that feeds a DC input voltage link of a DC/AC converter.

DE 10 2005 023 291 A1 discloses a power inverter including a resonant converter. The resonant converter comprises a high frequency transformer that forms a resonant series circuit in combination with a resonant capacitance connected to its primary winding. The secondary winding of the high frequency transformer is connected to a rectifier that is connected to a DC voltage input link of a DC/AC converter.

US 2008/0192510 A1 discloses a power inverter similar to the one known from DE 10 2005 023 291 A1. Here, the primary winding of the high frequency transformer is fed by a photovoltaic generator by means of an inverter full bridge, the center point of each of the half bridges of the inverter full bridge being connected to one end of the primary winding.

U.S. Pat. No. 5,587,892 A discloses a multi-phase power converter with harmonic neutralization, in which capacitors are connected to each end of a primary winding of a high frequency transformer. Each of these capacitors is combined with an inductor in addition to the high frequency transformer to provide a resonant series circuit.

There still is a need for a power inverter particularly suitable for feeding electric energy from small to medium sized photovoltaic modules into an AC power grid, the inverter being available at low cost but nevertheless displaying a high performance, i.e. low power losses at a high level of security.

SUMMARY

The present disclosure relates to a power inverter for feeding electric energy from a DC power generator into an AC grid with two-power lines. The inverter comprises two input terminals for connecting the power generator, two output terminals for connecting the two power lines of the AC grid, and a resonant converter including a high frequency transformer comprising a primary winding and a secondary winding, and at least one high frequency switched semiconductor power switch. In its closed state the semiconductor power switch connects one end of the primary winding of the high frequency transformer to one of the input terminals for providing a current path through the primary winding to the other one of the input terminals. The resonant converter further includes a resonant series circuit comprising an inductance and a capacitance, a high frequency rectifier rectifying a current through the secondary winding of the high frequency transformer and having two output lines, and an output converter connected between the output lines of the high frequency rectifier and the two output terminals.

In one embodiment of the present disclosure, the resonant converter further comprises a controller that is connected to the output terminals for receiving a voltage signal and provides high frequency control signals for controlling all semiconductor power switches of the resonant converter to sine-modulate an AC current fed into the AC grid in phase with the voltage signal. This means that the sine-modulation is performed by appropriately controlling the resonant converter instead of the output converter, which thus just feeds the half-waves of the current that have already been sine shaped to the correct output terminals. Particularly, the controller may vary a repetition rate of pulses in the high frequency control signals for sine-modulating the AC current fed into the AC grid. Further, the controller may vary an average repetition rate of the pulses in the high frequency control signals for controlling the electric power fed from the power generator into the AC grid.

In a more detailed embodiment of the present disclosure the resonant converter further comprises two half bridges connected between the input terminals, wherein each half bridge has two high frequency switched semiconductor power switches and a center. A primary winding of the high frequency transformer is connected between the centers of the two half bridges, and the controller provides one high frequency control signal per half bridge that is controlling (e.g., directly controlling) one of the two semiconductor power switches of the respective half bridge and that is inversed for controlling the other of the two semiconductor power switches of the respective half bridge for zero current switching (ZCS) of the semiconductor power switches of the half bridges. In this aspect, the controller particularly provides the high frequency control signals for full wave mode (FWM) zero current switching of the semiconductor power switches of the half bridges, wherein the controller varies a length of on-times of the primary winding, during which one of the semiconductor power switches of one of the half bridges that is connected to one of the input terminals and one of the semiconductor power switches of the other of the half bridges that is connected to the other of the input terminals are closed while the two other semiconductor power switches of the half bridges are open, in a range from about 50% to about 100% of the resonance period. Even more particularly, the controller may provide the two control signals at a delay or time shift with partially overlapping pulses, the partially overlapping pulses in both control signals being of equal length that is at least as long as the resonance period of the resonant series circuit of the resonant converter, and may vary the time shift between the two high frequency signals for varying the length of the on-times.

In a further more detailed embodiment of the present disclosure, the power inverter further comprises an electrical isolation barrier between the input terminals and the output terminals, the high frequency switched semiconductor power switches and the primary winding of the high frequency transformer being on the same side of the barrier as the input terminals, and the resonant series circuit including the secondary winding of the high frequency transformer, the high frequency rectifier and the output converter being on the same side of the barrier as the output terminals, and all lines crossing the isolation barrier comprising at least one of a high ohmic resistor or a capacitor at the isolation barrier.

In a further embodiment of the present disclosure, the resonant converter of the power inverter further comprises two half bridges connected between the input terminals, wherein each half bridge has two high frequency switched semiconductor power switches and a center. A primary winding of the high frequency transformer is connected between the centers of the two half bridges. A method of operating this power inverter comprises generating two high frequency control signals at a time shift between the two high frequency control signals, and applying the two high frequency control signals to those two semiconductor power switches of the two half bridges that are connected to one of the two input terminals to provide for on-times in which only one of these two semiconductor power switches is closed. In one embodiment, a length of the on-times is in a range from 50% to 100% of a resonance period of the resonant series circuit of the resonant converter. The method further comprises generating two inverse high frequency control signals, each being the inverse of one of the two high frequency control signals, and applying the two inverse high frequency control signals to those two semiconductor power switches of the two half bridges that are connected to the other of the two input terminals, such that each high frequency control signal and the inverse of that control signal are applied to the two semiconductor power switches of the same half bridge. Finally, the method comprises synchronously modulating all high frequency control signals to sine-modulate the AC current fed into the AC grid in phase with a voltage of the AC grid.

In a further embodiment of the present disclosure, which is also of importance for other types of power inverters, at least one varistor provided in an EMC-filter connected between the output converter and the two output terminals. The embodiment further comprises chokes selected from common mode chokes and hybrid choke coils that are connected between center taps or other suitable taps of the common mode chokes or hybrid choke coils. Their actual design will be described later.

In a further embodiment of the present disclosure, the power inverter comprises a ground terminal for connecting a power grid ground line, wherein one of the input terminals is connected to one of the input lines of the line-commutated full bridge output converter via a resistor on the one hand, and to the ground terminal via a capacitor on the other hand. As a result, the one input terminal exhibits a fixed potential offset that is adjustable between electric ground and the average voltage present at the connected one of the output lines of the high frequency rectifier by the ratio of a resistance of the resistor connecting the input terminal to the input line of the output converter and of a resistance of a further resistor connected in parallel to the capacitor connecting the input terminal to the ground terminal.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The disclosure can be better understood with reference to the following drawings. In the drawings, like reference numerals designate corresponding parts throughout the several views.

DETAILED DESCRIPTION

In one embodiment, the DC power generator may be a photovoltaic power generator. Even more particular, the photovoltaic power generator may be a small to medium sized photovoltaic module, and the power inverter may only be provided for feeding the electric energy from this photovoltaic module into the AC grid.

The AC grid with two-power lines may be a single phase AC grid in which one of the two power lines is a phase line whereas the other power line is a neutral line. Such an AC grid may in particular be a single phase AC grid according to the European standard. The AC grid with two-power lines may also be a split-phase grid with a neutral midpoint, the two-power lines being the two wires between which the split-phase alternating voltage is present. Such an AC grid may in particular be a split-phase grid according to the US standard.

Figure 1:
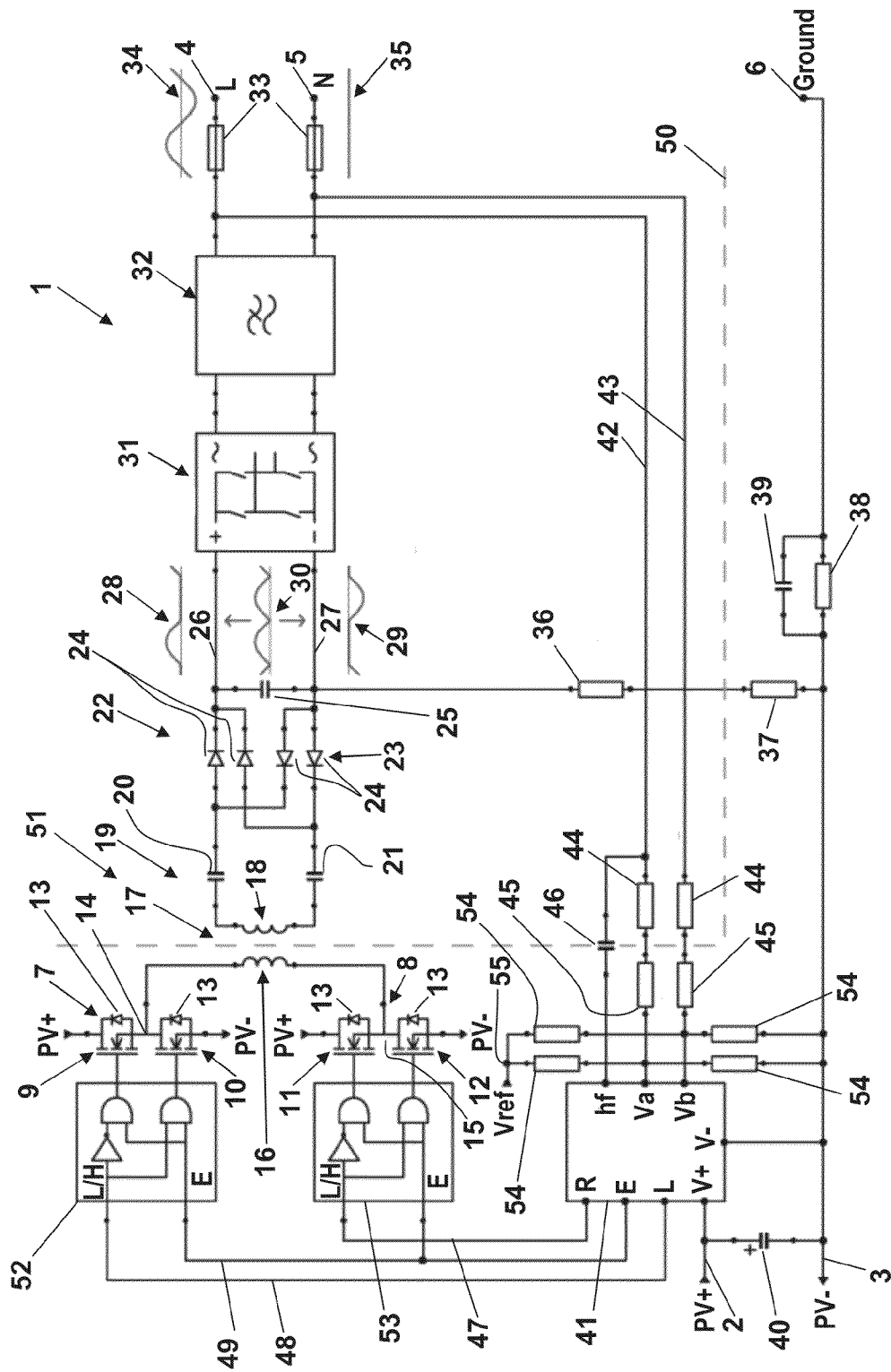
FIG. 1 is a circuit diagram of a first example of the power inverter applicable for feeding electric power from a photovoltaic power generator into a single phase AC grid according to the European standard.
Figure 2:
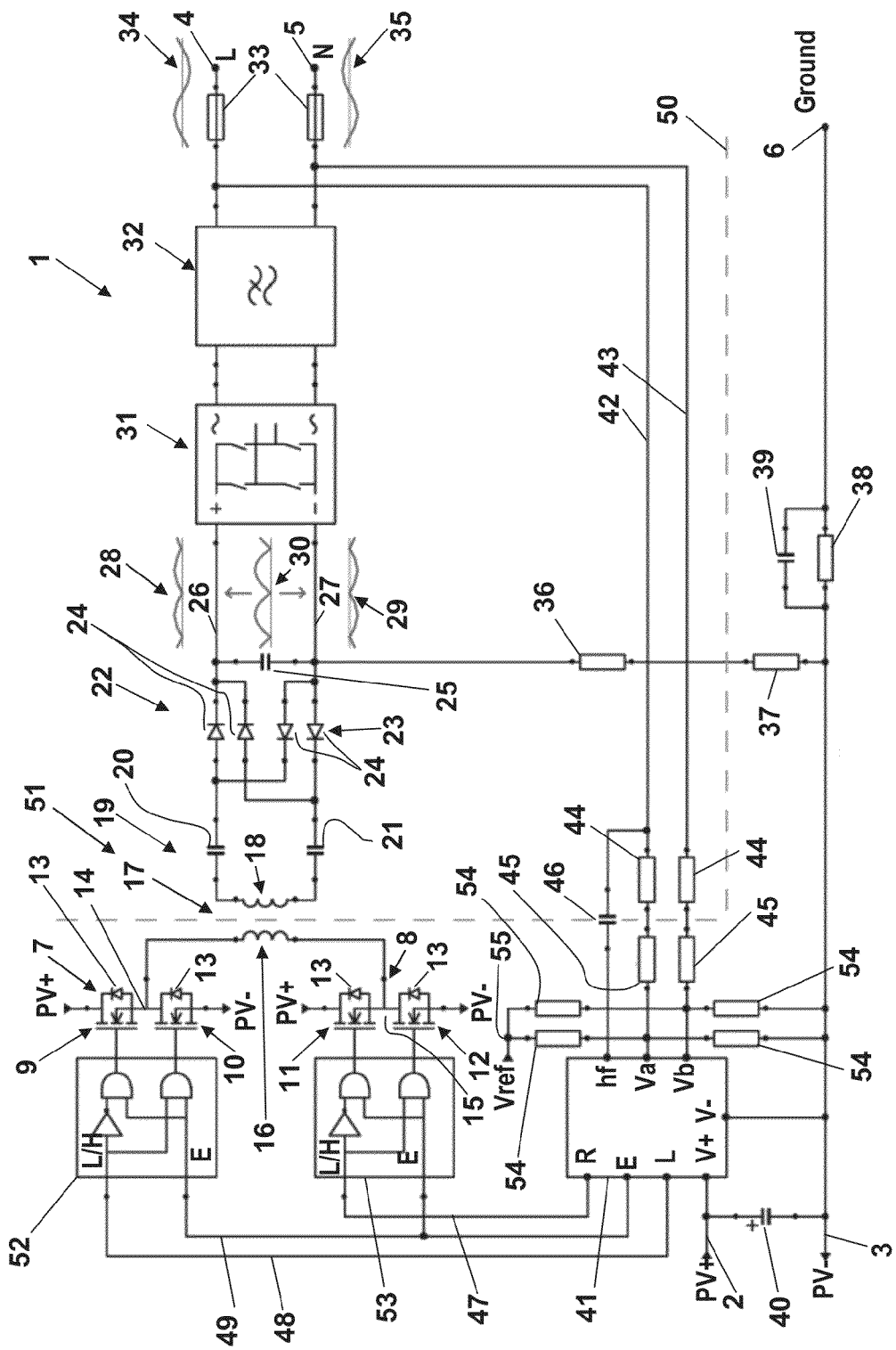
FIG. 2 is a circuit diagram of the same topology as depicted in FIG. 1 indicating that it is also applicable for feeding electric power from the photovoltaic power generator or any other DC power generator into a split-phase AC grid according to the US standard.

Referring now in greater detail to FIGS. 1 and 2, a power inverter 1 comprises two input terminals 2 and 3, two output terminals 4 and 5, and a ground terminal 6. The two input terminals 2 and 3 are provided for connecting a DC power generator, like, for example, a photovoltaic power generator. In one embodiment, the power generator is a photovoltaic module providing a DC output voltage of 12 to 60 Volts, like, for example, about 25 Volts. The output terminals 4 and 5 and the ground terminal 6 are provided for connecting the power inverter 1 to an AC power grid having two power lines to be connected to the output terminals 4 and 5 and a ground line to be connected to the ground terminal 6. The peak voltage between the power lines of the AC grid, which is applied between the output terminals 4, 5, may be up to about 400 V. The power inverter 1 feeds electric power from the power generator connected to the input terminals 2 and 3 into the AC grid connected to the output terminals 4 and 5.

The electric potentials PV+ and PV− applied to the input terminals 2 and 3 are applied to two inverter half bridges 7 and 8. Each inverter half bridge 7 and 8 comprises two semiconductor power switches 9 and 10, and 11 and 12, respectively. If the semiconductor power switches 9 to 12 are MOSFETs as diagrammatically indicated here, they each include an anti-parallel diode 13. The anti-parallel diodes 13 are, however, not required for the function of the power inverter 1 that is described here. Further, each half bridge 7 and 8 has a center 14 and 15, respectively. A primary winding 16 of a high frequency transformer 17 is connected between the center points 14 and 15 of the half bridges 7 and 8, and the semiconductor power switches 9 to 12 of the half bridges 7 and 8 are controlled to conduct current from the power generator connected to the input terminals 2 and 3, which is not depicted here, in alternating directions through the primary winding 16. When no current shall be conducted from the power generator connected to the input terminals 2 and 3 through the primary winding, the semiconductor power switches 9 to 12 of the half bridges 7 and 8 are controlled to short-circuit the ends of the primary winding 16.

When all semiconductor power switches 9 to 12 of the half bridges 7 and 8 are open, the power generator that is connected to the input terminals 2, 3 is effectively disconnected from the AC grid that is connected to the output terminals 4 and 5. Thus, there is no need for an additional relay to provide this separation. Even if one of the semiconductor power switches does not open due to a failure, the power generator would still be separated from the AC grid. This means a higher level of security than with a relay, the contacts of which may weld together. If for some reason an additional relay is to be provided between the power inverter and the AC grid, this relay may be provided for a plurality of power inverters each feeding electric power from one power generator into the AC grid. This aspect of the present disclosure will be explained in more detail later, with reference to FIG. 13.

The high frequency transformer 17 is part of a resonant series circuit 19 that further comprises two capacitors 20 and 21 of equal capacitance. The capacitors 20 and 21 are symmetrically connected to a secondary winding 18 of the high frequency transformer 17 with one of their ends, i.e., one end of each capacitor is connected to each end of the secondary winding 18. There is no separate inductor besides the high frequency transformer 17 providing the inductance of the resonant series circuit 19. Thus, the losses due to magnetic leakage are kept to a minimum here. The provision of the capacitance of the resonant series circuit 19 by two capacitors 20 and 21 that are connected to both ends of the primary winding 18 reduces the required electric strength for both the capacitors and the high frequency transformer, and reduces common mode injection of noise and therefore requires less filtering. Further, it is possible to use Y-capacitors here in one embodiment.

A high frequency rectifier 22 designed as a rectifier full bridge 23 of diodes 24 rectifies the current in the resonant series circuit 19 on the secondary winding 18 side of the high frequency transformer 17 that results from the voltage induced by the current through the primary winding 16. A capacitor 25 connected between output lines 26 and 27 of the high frequency rectifier rejects the high frequency components of the rectified current but lets the low frequency components of this rectified current pass. Particularly, it has a cut-off frequency above a grid frequency of the AC grid connected to the output terminals 4 and 5. For practical reasons the cut-off frequency may be in the order of a few kHz. The resulting small capacitance of the capacitor 25 allows for a capacitor 25 of low dimensions and little cost; it also ensures that only very little reactive power is drawn by the capacitor 25 out of the AC grid connected to the output terminals 4 and 5 via an output converter 31, and it neither excites dangerously high currents into the capacitor 25 during a start-up, nor from the capacitor 25 after stopping and disconnecting the power inverter from the AC grid. The parts of the power inverter 1 between the input terminals 2 and 3 and the output lines 26 and 27 described up to know constitute a resonant converter 51. The capacitor 25, however, may also be placed further downstream, like, for example, at the output end of the output converter 31.

The differential voltages present at the output lines 26 and 27 as well as between the output lines 26 and 27 during one period of the grid frequency are indicated in small V(t) plots 28, 29 and 30, respectively. While the differential voltages present at the output lines 26 and 27 do not differ between FIGS. 1 and 2, the variation of the voltages in time on the output lines 26 and 27 depend on the kind of grid connected to the output terminals 4 and 5. This is particularly the case as the output lines 26 and 27 of the resonant converter 51 are connected to the output terminals 4 and 5 via the line-commutated full bridge converter 31 that serves as an unfolding bridge correctly unfolding the current half waves flowing through the output lines 26 and 27 to the output terminals 4 and 5. Such line-commutated converters, in which switching elements of the full bridge are only controlled by the voltages of the external AC grid connected to the output terminals 4 and 5, are generally known.

Figure 3:
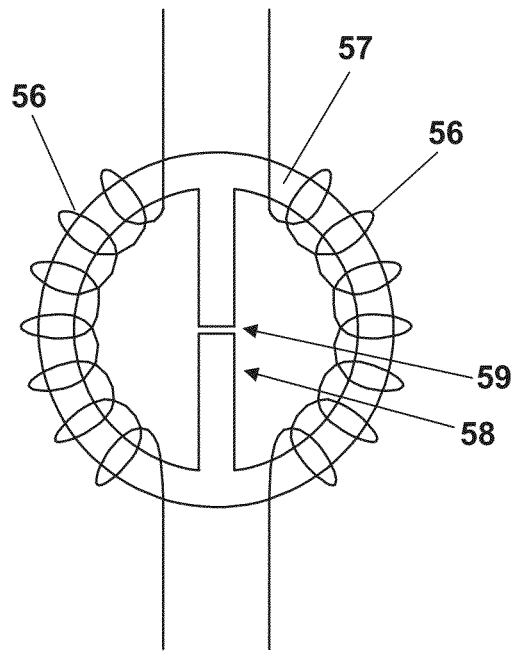
FIG. 3 shows hybrid choke coils, which may be used in an EMC-filter of the power converter according to FIG. 1 or 2.

It is also generally known to have an EMC-filter 32 connected between the output converter 31 and the output terminals 4 and 5 to care for electromagnetic compliance. However, the EMC-filter 32 may deviate from a standard EMC-filter in that it comprises common mode chokes or in one embodiment hybrid choke coils instead of standard chokes. Common mode chokes are arranged on a common magnetic core that typically is in a ring shape. Common mode chokes have to be combined with standard chokes arranged between the common mode chokes and the output terminals. Hybrid choke coils 56, an example of which is depicted in FIG. 3, are arranged on a common ring magnetic core 57 that has an additional web 58, for example, comprising an air gap 59, and do not require additional chokes within the EMC-filter 32. An electrically conductive material may be provided in the air gap 59 to achieve an increased attenuation of high frequency oscillations of the currents flowing through the chokes. This attenuation is due to eddy currents generated in the electrically conductive material by such oscillations. Suitable electrically conductive materials are copper and aluminum, which are, for example, provided as a foil extending through the air gap 59.

Figure 4:
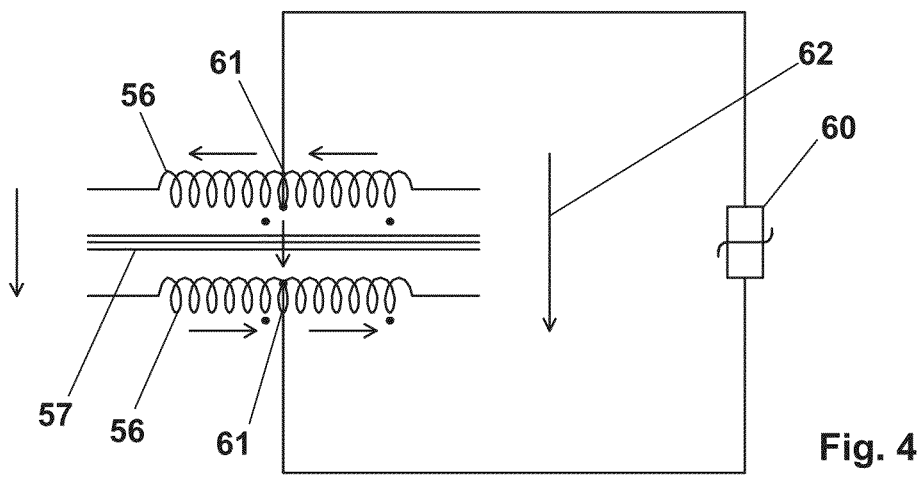
FIG. 4 illustrates the connection of a varistor to taps of common mode chokes or hybrid choke coils for use in an EMC-filter of the power inverter of FIG. 1 or 2.

Both common mode chokes and hybrid choke coils 56 of the EMC-filter 32 are particularly well suited for the connection of a varistor 60 protecting the power inverter 1 against overvoltages in the AC grid that is connected to the output terminals 4, 5, and vice versa protecting the AC grid against overvoltages occurring in the power inverter 1. FIG. 4 shows how the varistor 60 is connected between taps 61 of the two hybrid choke coils 56. A further varistor, not depicted here, may be added between the hybrid choke coils 56 at their input ends at the left hand side of FIG. 4. In case of an overvoltage 62 that may come from the right hand side of the hybrid choke coils 56 depicted in FIG. 4 and that causes a current through the varistor 60, the parts of the common mode chokes on the right hand side of the taps 61 in FIG. 4 choke the current through the varistor 60. At the same time an additional voltage drop in the parts of the hybrid choke coil 56 on the left hand side of the taps 61 in FIG. 4 is induced that coincides with the voltage drop due to the actual current through the varistor 60, because of the magnetic coupling of the hybrid choke coil 56 via the ring magnetic core 57. As a result, the varistor needs to get conductive only at comparatively high overvoltages 62 and has to stand only comparatively low currents but nevertheless effectively avoids the transmittance of overvoltages across the hybrid choke coils 56. A varistor connected to taps of common mode chokes or hybrid choke coils is not only of advantage in a power inverter 1 as described here. This combination of a varistor and common mode chokes or hybrid choke coils may also be used in EMC-filters of other power inverters or in other technical fields.

Finally, fuses 33 are connected between the EMC-filter 32 and the individual output terminals 4 and 5 of the power inverter according to FIG. 1 or 2. Small V(t) plots 34 and 35 indicate the variations of the voltages in time applied by an external AC grid to the output terminals 4 and 5, which by means of the line-commutating converter 31 define the variations of the voltages in time indicated in the V(t) plots 28 and 29 on the output lines 26 and 27 of the resonant converter 51 depending on the variation of the voltage in time between the output lines 26 and 27 indicated in the V(t) plot 30, which is determined by the operation of the half bridges 7 and 8. However, independent of the standard of the AC grid connected to the output terminals 4 and 5, the average voltage on output line 26 is always positive and the average voltage on output line 27 is always negative with regard to the neutral line N connected to output terminal 5 in FIG. 1 or to the midpoint neutral between the lines L1 and L2 connected to the output terminals 4 and 5 in FIG. 2. The values of theses average voltages are both at about 50% of the effective value of the voltage applied between the output terminals 4 and 5. The negative average voltage on line 27 is used to provide a negative offset voltage to the input terminal 3, here. To this end, line 27 is connected to input terminal 3 via two resistors 36 and 37, which could be replaced by a singe resistor but which is not done here on purpose, as explained later. Further, input terminal 3 is connected to ground connector 6 via a parallel connection of another resistor 38 and a capacitor 39 and, thus, connected to the ground of the AC grid, which is connected to the ground connector 6. In principle, the resistor 38 in this connection of input terminal 3 to ground is optional. Here, the resistors 36 to 38 provide a voltage divider defining a voltage offset for input terminal 3 that is at a defined voltage level between electrical ground and the average voltage on line 27. This offset voltage of the input terminal 3 does not exhibit the time course depicted in plot 29 but is temporally averaged by capacitor 39. Still the capacitor 39 is of small capacitance only to ensure a connection of the input terminal 3 to ground for high frequency currents and voltages for security reasons. If the absolute value of the negative offset voltage at the input terminal 3 is higher than the output voltage of the photovoltaic power generator connected to input terminals 2 and 3, this allows for operating the photovoltaic power generator completely at a negative potential with regard to ground, which has huge advantages with some photovoltaic power generators for avoiding premature degradation.

A capacitor 40 that has a high capacitance is connected between the input terminals 2 and 3 and serves as a buffer, stabilizing the voltage difference between the input terminals 2 and 3, which is provided by the connected power generator, during pulsed operation of the half bridges 7 and 8. The capacitor 40 is particularly used to suppress the 100 or 120 Hz ripple voltage that is characteristic for single phase inverters.

The two half bridges 7 and 8 of the resonant converter 51 are operated by a controller 41 via drivers 52 and 53. Generally, the controller 41 operates the half bridges 7 and 8 in such a way that the current flowing through lines 26 and 27 consists of sine-shaped half waves that are in phase with the AC grid connected to the output terminals 4 and 5. No shaping of the current fed into the AC grid by the power inverter 1 is possible by the output converter 31 as long as it is line-commutated. The controller 41 receives the voltages applied by the AC grid to the output terminals 4 and 5 via signal lines 42 and 43, in which isolation resistors 44 and 45 are arranged. The resistors 44 and 45 in the signal line 42 are bypassed by a capacitor 46 to enable the controller 41 to receive high frequency power line communication signals via the signal line 42 without attenuation by the resistors 44 and 45. The line frequency signals Va and Vb received by the controller 41 via the signal lines 42 and 43 are used for synchronizing the operation of the half bridges 7 and 8 with the alternating voltage of the AC grid connected to the output terminals 4 and 5. The controller 41 provides two pulsed control signals R and L and an enable signal E to the drivers 52 and 53 via control lines 47 to 49. The enable signal turns on and off the drivers 52 and 53 and, thus, the entire power inverter 1.

Figure 5:
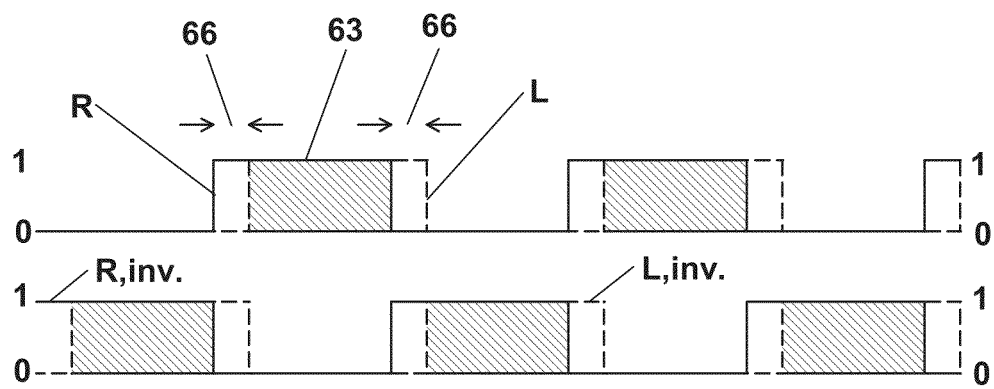
FIG. 5 is a timing diagram of one possible embodiment of high frequency control signals applied to semiconductor power switches of the power inverter of FIG. 1 or 2.

According to one possible embodiment illustrated in FIG. 5, the control signal R consists of pulses 63 that typically have a fixed duty cycle of about 50%. The repetition rate of the pulses 63 is variable up to about half the resonance frequency of the resonant series circuit 19. Thus, the duration of the pulses is at least as long as the resonance period of the resonant series circuit 19. The control signal L is equal to the control signal R, but time-shifted by 50 to 100% of the resonance period of the resonant series circuit 19. The driver 52 inverts the control signal L for operating the semiconductor switch 9 and uses it directly for operating the semiconductor switch 10. Likewise, the driver 53 inverts the control signal R for operating the semiconductor switch 11 and uses it directly for operating the semiconductor switch 12. The inverted signals L, inv. and R, inv. are depicted at the bottom of FIG. 5. Thus, always one of the switches 9 and 10 and one of the switches 11 and 12 is closed, whereas the other is open. During the transients between the switches 9 and 10 and the switches 11 and 12, respectively, a small dead time may be inserted during which none of the two switches is closed. This means that the signals L, inv. and R, inv. may somewhat differ from a true inversion of the signals L and R. However, such a dead time will always be much smaller than the on-time of the switches. For example, the dead time may be 20 ns, and the on-time may be 0.5 us. The half bridges 7 and 8 operated in this way only provide a current path between the input terminals 2 and 3 through the primary winding 16 of the high frequency transformer 17 if the values of the control signals R and L differ from each other. At other times than these on-times, i.e. when the signals R and L have the same values, the primary winding 16 is either short-circuited by the switches 9 and 11 or the switches 10 and 12, which are both closed then and, thus, connect the center points 14 and 15 during these times. Varying the temporal overlap and, thus, inversely proportionally varying the length of the on-time, during which the primary winding 16 is connected to the input terminals 2 and 3, in a range from 50% to 100% of the resonance period of the resonant series circuit 19 allows for full wave mode zero current switching of the switches 9 to 12 despite of a variation of the point in time of the second zero crossing of the current after the start of the on-time. The optimum length of the on-times for the primary winding 16 and the corresponding optimum overlap of the pulses 63 of the control signals R and L primarily depends on the voltage applied by the AC grid via the output converter 31, which strongly influences the time-course of the current through the primary winding 16 during the second half of the resonance period of the series resonant circuit 19. This will be explained in detail later with reference to FIGS. 6 to 10.

With full wave mode zero current switching it is not possible to form the time-dependent shape of the currents flowing through lines 26 and 27 by pulse width modulation as the pulse width is already defined by the zero current switching criterion. Thus, modulation of the repetition rate of the pulses is the only way of modulating the currents flowing through lines 26 and 27 for providing sine-shaped half waves and to control the power fed from the power generator connected to the input terminals 2 and 3 into an AC grid connected to the output terminals 4 and 5 by the power inverter 1. Thus, the controller 41 varies the repetition rate of the pulses of the signals R and L within each period of the grid frequency for sine-shaping the currents through the lines 26 and 27, and further varies the average value of the repetition rate of the pulses in the control signals R and L to optimize the power fed into the AC grid. This may be done according to a generally known maximum power point (MPP) tracking method. Additionally, the controller 41 optimizes the time shift of the control signals R and L or the overlap of their pulses 63, respectively, for zero current switching the semiconductor power switches 9 to 12 of the half bridges 7 and 8 at the respective voltage applied between the lines 26 and 27 by the AC grid connected to the output terminals 4, 5. These various optimizations may be achieved in that a look-up table is stored in the controller and that the controller looks up suitable on-times and repetition rates or even ready-to-use pulse sequences in that table depending on the instantaneous voltage difference between the output terminals 4 and 5 monitored by the controller at Va and Vb. A typical range within which the controller varies the repetition of the pulses in the control signals R and L extends from 20 to 500 KHz.

In the power inverter 1, an isolation barrier 50 is formed that encloses all parts from the secondary winding 18 of the high frequency transformer 17 up to the output terminals 4 and 5. In this isolated part of the power inverter 1 only very little electric energy is stored at any time as the secondary winding 18 is of small inductance and as the capacitors 20, 21 and 25 are all of small capacitance. Thus, as long as the half bridges 7 and 8 are not operated, and as long as no grid is connected to the output terminals 4 and 5, touching any component of the power inverter enclosed by the isolation barrier is without risk, even if a power generator is connected to the input terminals 2 and 3 and applies a voltage between these input terminals. In the direction of the power flux from the input terminals 2 and 3 to the output terminals 4 and 5 the isolation barrier is not only provided by the transformer 17 but also by the capacitors 20 and 21 that are providing an additional galvanic separation and more or less block currents with the grid frequency of 50 Hz, for example. In the signal lines 42 and 43 the isolation barrier is provided by the capacitor 46 and by the high ohmic resistors 44 and 45 arranged on both sides of the barrier 50. In the connection between the input terminal 3 and the line 27 the two resistors 36 and 37 provide the isolation barrier between them.

In the power inverter 1, a reference voltage Vref from a controller internal ADC is used for providing a defined 50% voltage offset by means of connecting four ohmic resistors 54 of equal resistance as follows: One resistor 54 is connected between the input terminal 3 and the end of the signal line 42 connected to the controller 41 at its terminal Va. One resistor 54 is connected between the input terminal 3 and the end of the other signal line 43 connected to the controller 41 at its terminal Vb. The two other resistors 54 are connected between a reference voltage point 55 at which the reference voltage Vref is provided and the ends of the signal lines 42 and 43 which are connected to the controller 41.

The semiconductor power switches 9 to 12 of the half bridges 7 and 8 are operated under a full wave mode zero current switching scheme, and the topology of the power inverter 1 according to FIGS. 1 and 2 is tuned to this switching scheme. As a result, the resonant converter 51 according to FIGS. 1 and 2 basically acts as a current source, i.e., a power source that, independently of the voltage applied between these lines 26 and 27 by the AC grid connected to the output terminals 4, 5, provides a current to the lines 26 and 27, which is shaped at the primary side of the high frequency transformer 17. This, however, does not exactly apply when the instantaneous voltages between the lines 26, 27 are close to zero and when the corresponding currents to be fed into the AC grid are low. In that case, a larger part of the electric power fed into the primary winding 16 of the high frequency transformer 17 during the first half wave of the resonance period of the resonant converter 19 is fed back into the buffer capacitor 40 during the second half wave of the resonance period before the on-time of the primary winding 16 ends by short-circuiting it. As a result, the current effectively fed from the power generator to the AC grid during one on-time of the primary winding 16 is reduced. This is advantageous as the repetition rate of the pulses in the high frequency control signals may be kept at higher levels with voltages between the lines 26 and 27 close to zero as it would be possible without the feedback of a part of the power into the buffer capacitor 40. A high repetition rate of the pulses in the high frequency control signals R, L means a better controllability, and no medium to low frequency noise, which cannot be filtered away by the filter capacitor 25, is induced by the switching of the semiconductor power switches 9 to 12.

Figure 6:
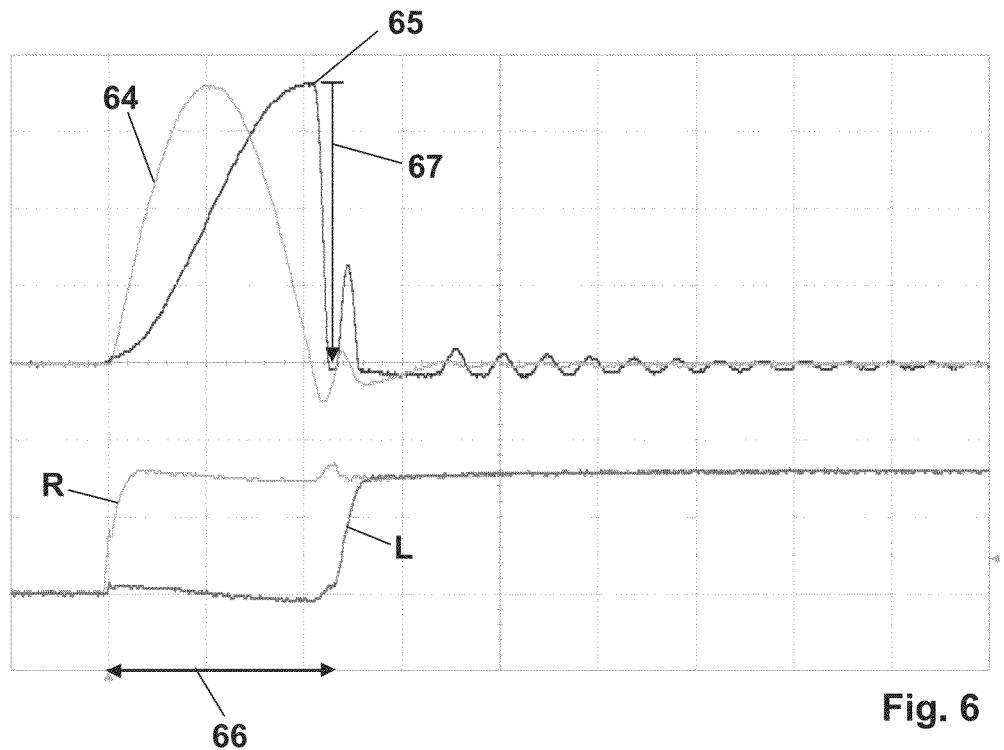
FIGS. 6 to 10 illustrate a current through a primary winding and a voltage across a secondary winding of a high frequency transformer of the power inverter of FIG. 1 or 2 at a constant input voltage provided by a connected power generator and at different instantaneous output voltages defined by a connected AC grid.
Figure 7:
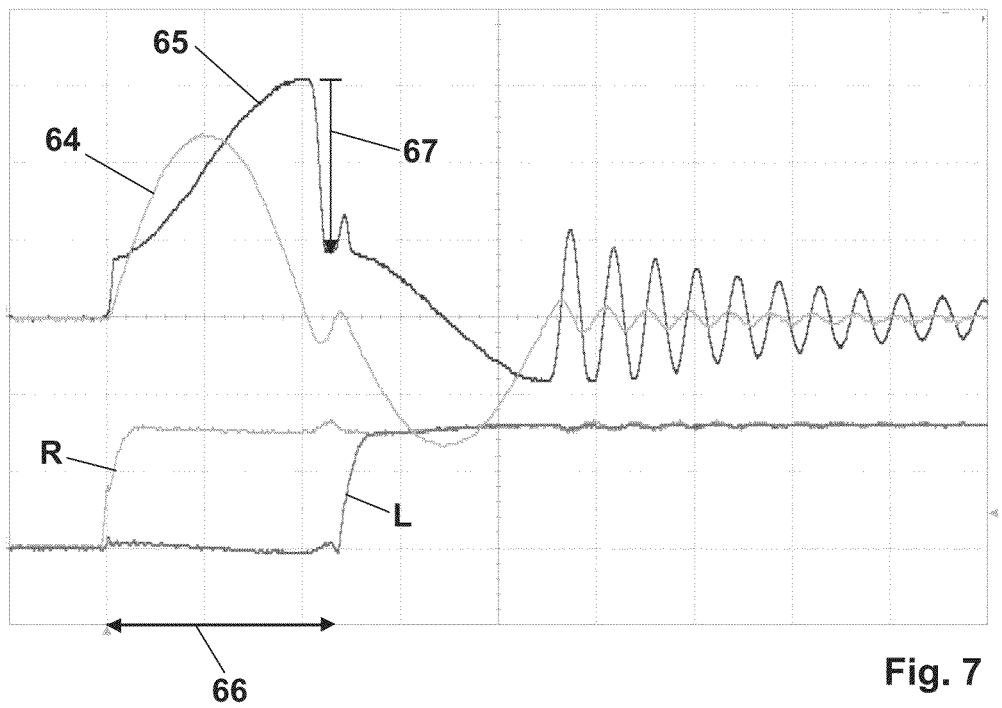
Figure 8:
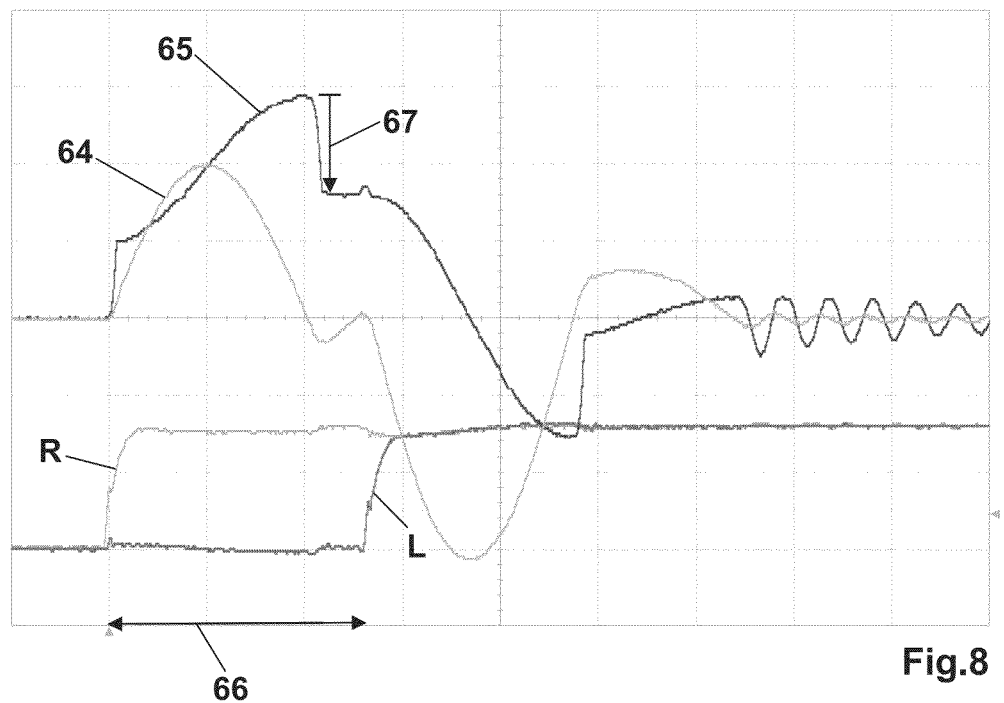
Figure 9:
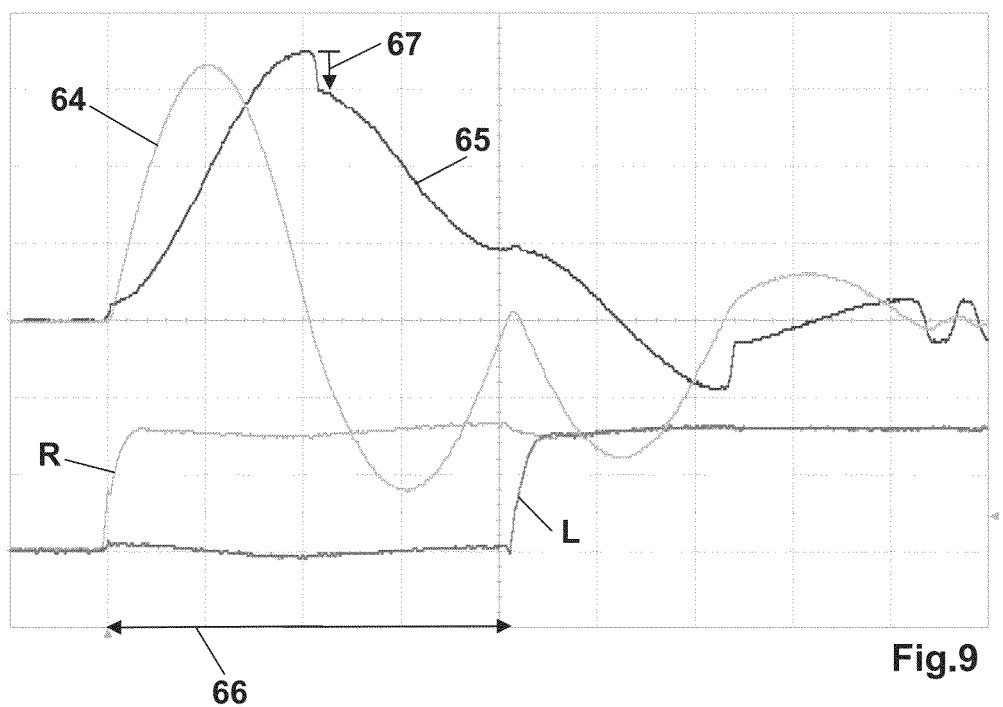
Figure 10:
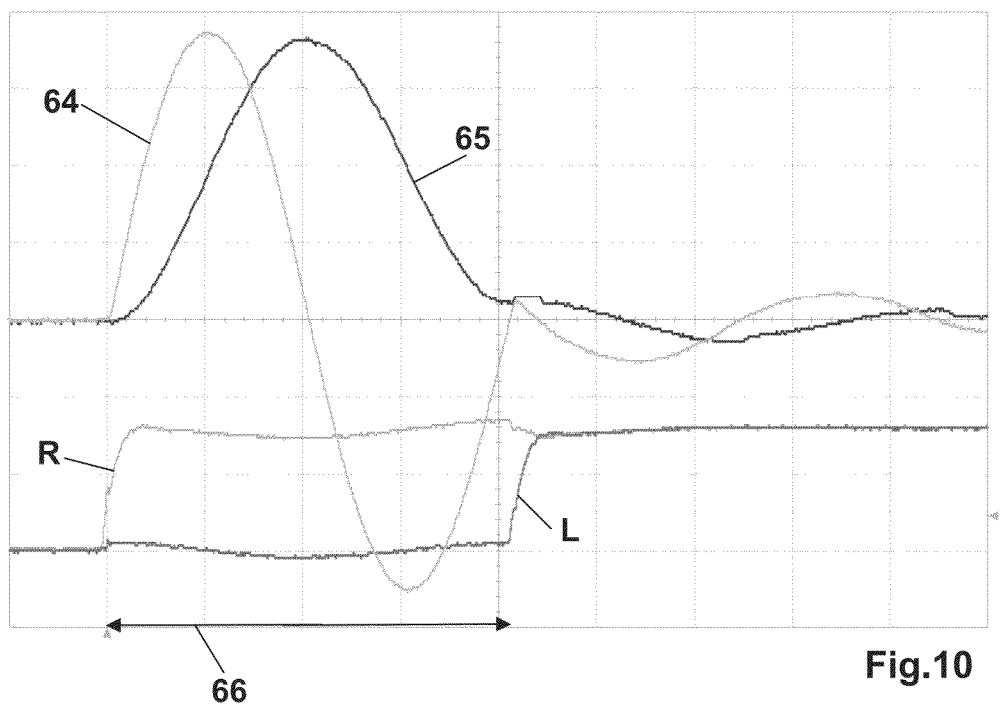

FIGS. 6 to 10 illustrate the time course of the current 64 through the primary winding 16 and the voltage 65 across the secondary winding 18 of the high frequency transformer 17 of the power inverter 1 according to FIGS. 1 and 2 during and following one on-time 66 defined by the time shift between the control signals R and L according to the full wave mode zero current switching scheme, i.e., the on-time 66 ends when the current 64 becomes zero for the second time after the beginning of the on-time 66 and when the current would essentially remain zero with an ongoing on-time 66. The voltage across the buffer capacitor applied to the primary winding 16 during the on-time 66 is the same (25 Volts) for all FIGS. 6 to 10. With a transformer ratio of 1:16 of the high frequency transformer, this input voltage corresponds to a maximum output voltage of the high frequency transformer of 400 V. The external voltage that is presently applied to the output lines 26 and 27, for example by an AC power grid connected to the output terminals 4 and 5 via the output converter 31 according to FIG. 1, however, decreases from FIG. 6 to FIG. 10. It is about 375 Volts for FIG. 6, about 225 Volts for FIG. 7, about 125 Volts for FIG. 8, about 50 Volts for FIG. 9, and about 2 Volts for FIG. 10. Considering the voltage applied to the primary winding and considering the transformer ratio of the high frequency transformer, these external voltages correspond to relative voltages of 94% (FIG. 6), 56% (FIG. 7), 31% (FIG. 8), 12.5% (FIG. 9), and 0.5% (FIG. 10). The absolute instantaneous value of the presently applied external voltage can indirectly be seen in FIGS. 6 to 9 from a voltage drop 67 occurring at the beginning of the second half wave of the resonance period, when the diodes 24 of the rectifier full bridge 23, which have previously been conductive, are commutated due to the changing direction of the current 64. With a high value of the presently applied external voltage, the electric power fed into the resonant series circuit 19 during the first half wave of its resonance period is transferred through the high frequency rectifier 22 into the lines 26 and 27 particularly easily. As a result, the current 64 according to FIG. 6 drops to low values and essentially remains there already at the end of the first half wave of the resonance period, when the diodes 24 of the rectifier full bridge 23, which have previously been conductive, are commutated with the change of direction of the current 64. This allows for an early termination of the on-time 66 at a current 64 of zero or close to zero. The time of the second zero crossing of the current 64 determining the end of the on-time 66 according to FIG. 6 is no longer defined by the resonance period of the resonant series circuit 19 but by other time constants. These other time constants resulting in a shorter resonance period, also define the time course of the current 64 and of the voltage 65 after the on-time 66. In FIGS. 7 and 8 the time between the first and the second zero crossing of the current 64 is still much shorter than 50% of the resonance period of the resonant series circuit 19, but there is an increasing current 64 through the short-circuited primary winding 16 after the on-time 66 that displays a half wave of a duration of about 50% of the resonance period of the resonant series circuit 19. This portion of the current indicates an increasing amount of electric power that is still in the resonant series circuit 19 at the end of the on-time 66 and that is forwarded through the high frequency rectifier 22 into the lines 26, 27 only after the on-time 66. With a further decrease of the instantaneous value of the presently applied external voltage the length of the second half wave of the current 64 during the on-time 66, i.e., between its first and second zero crossing, gets longer. This behavior becomes predominant at a relative voltage of about ⅓ as in FIG. 8; and In FIG. 9 the second half wave has already extended to a length of about 50% of the resonance period of the resonant series circuit 19. As a result, a considerable part of the electric power fed from the buffer capacitor 40 into the primary winding 16 during the first half wave of the current 64 is fed back into the buffer capacitor 40 during the second half wave, which is accounted for by extending the length of the on-time 66 in FIG. 9. This procedure of extending the on-time at low instantaneous output voltages and, thus, feeding back energy into the buffer capacitor 40 reduces the electric power transferred by the high frequency transformer 17 during one on-time 66 and allows for maintaining a high repetition rate of the on-times 66 even with low instantaneous output voltages, low output currents and corresponding low instantaneous output powers. The electric power that is still in the resonant series circuit 19 after the on-time oscillates in the resonant series circuit 19 and is transferred from there through the high frequency rectifier 22 into the lines 26 and 27. Thus, the two half waves of the current 64 after the end of the on-time 66 seen in FIGS. 9 and 10 indicate that a part of the electric power is still transferred from the power generator to the AC grid. In FIG. 10 this fraction of transferred power is strongly reduced due to the very low instantaneous output voltage, i.e., only very little electric power is effectively transferred during the on-time 66 according to FIG. 10 while the major part initially transferred during the first half wave is stored back into the buffer capacitor 40 during the second half wave of the resonant frequency of the resonant series circuit 19. This allows for a still high repetition rate of the on-times 66 at an instantaneous output voltage close to zero and with corresponding output current and instantaneous output power close to zero. While FIGS. 6 to 10 indicate that the on-times 66 may be terminated by monitoring the current 64 and waiting for its second zero crossing after the beginning of the on-times 66, the on-times 66 are, in one embodiment, selected from a table based on the instantaneous value of the external voltage, or even better on a ratio of this instantaneous value of the external voltage and the present value of the voltage across the buffer capacitor applied to the primary winding during the on-times 66, or on the instantaneous relative voltage as defined above.

Figure 12:
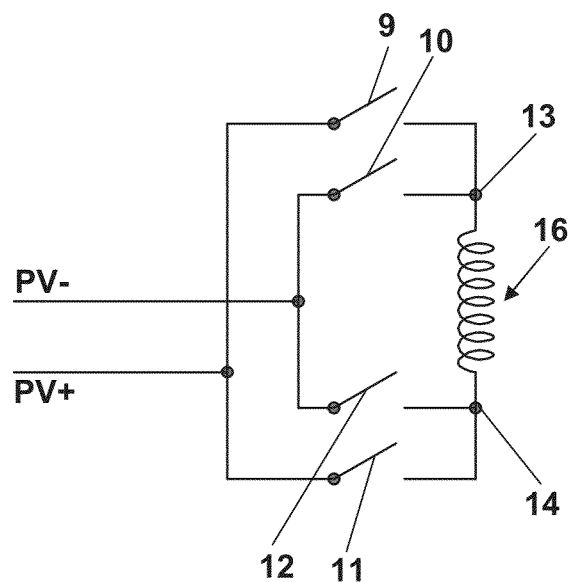
FIG. 12 illustrates a spatial arrangement according to one embodiment of the semiconductor power switches controlled by the high frequency signals according to FIG. 11.
Figure 11:
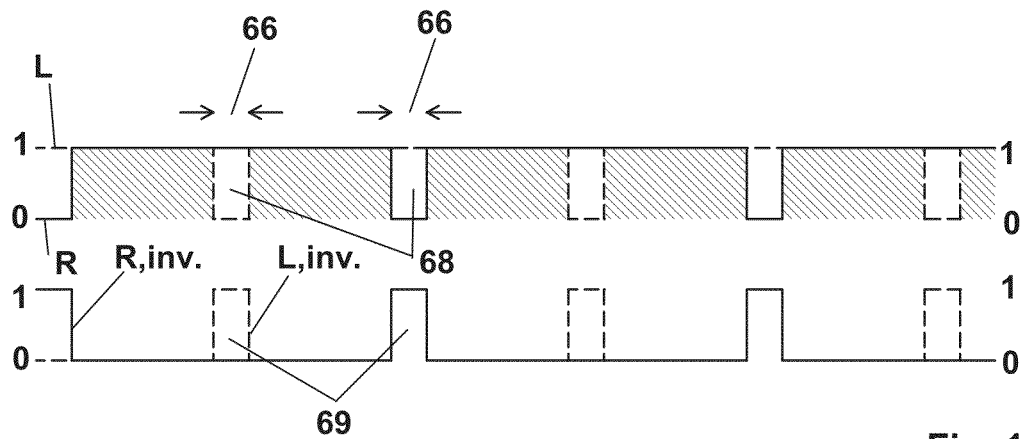
FIG. 11 is a timing diagram of another possible embodiment of high frequency control signals for the semiconductor power switches of the power inverter according to FIG. 1 or 2.

FIG. 11 shows an alternative scheme for the high frequency control signals R and L according to FIG. 5. In this scheme, the length of the on-times 66 is not defined by a time shift between the high frequency control signals R, L but by the length of dips 68 in the signals R, L that are otherwise on, and that exhibit a fixed time shift between the signals R and L of half the period of the signals R and L. The corresponding inverted control signals R,inv. and L,inv. exhibit pulses 69 of the same length as the dips 68. While the primary winding 16 of the high frequency transformer 17 according to FIGS. 1 and 2 when clocked with the scheme according to FIG. 5 is short-circuited in an alternating manner by either the semiconductor power switches 9 and 11 that are controlled by the inverted control signals R,inv. and L,inv. or by the semiconductor power switches 10 and 12 that are controlled by the original control signals R and L, as shown by cross-hatched intervals in FIG. 5, the high frequency control signals R, L according to FIG. 11 result in the primary winding 16 being short-circuited always by the semiconductor power switches 10 and 12 that are controlled by the high frequency signals R and L, as shown by cross-hatched intervals in FIG. 11. This can be used advantageously to customize the spatial arrangement of the semiconductor power switches 9 to 12 with regard to the primary winding 16, e.g., in a board layout of the inverter 1, as indicated in FIG. 12. The semiconductor power switches 10 and 12 that are directly controlled by the control signals R, L are arranged in FIG. 12 in such a way that they connect the center points 13 and 14 and, thus, the ends of the primary winding 16 via a shorter current path than the semiconductor power switches 9 and 11. Thus, electrical losses due to currents circulating through the short-circuited primary winding 16 after the on-times 66 are kept at a minimum.

Zero current switching of the semiconductor power switches 9 to 12 may not reduce the switching losses to the same extent as zero voltage switching. However, this is more than outweighed by the fact that the switching losses at the limited input voltages of the power inverter 1 are also limited, that the controlling losses, i.e., the electric power needed for controlling the semiconductor power switches 9 to 12 in operation, are particularly low with zero current switching, i.e., lower than with zero voltage switching, and that only full wave mode zero current switching allows for a reduced power transfer during each on-time in case of low instantaneous output voltages. This reduced power transfer in turn allows for keeping a high repetition rate of the pulses, i.e., a high switching frequency, even at these low instantaneous output voltages that occur twice during each period of the alternating voltage of the AC grid connected to the output terminals 4, 5.

Figure 13:
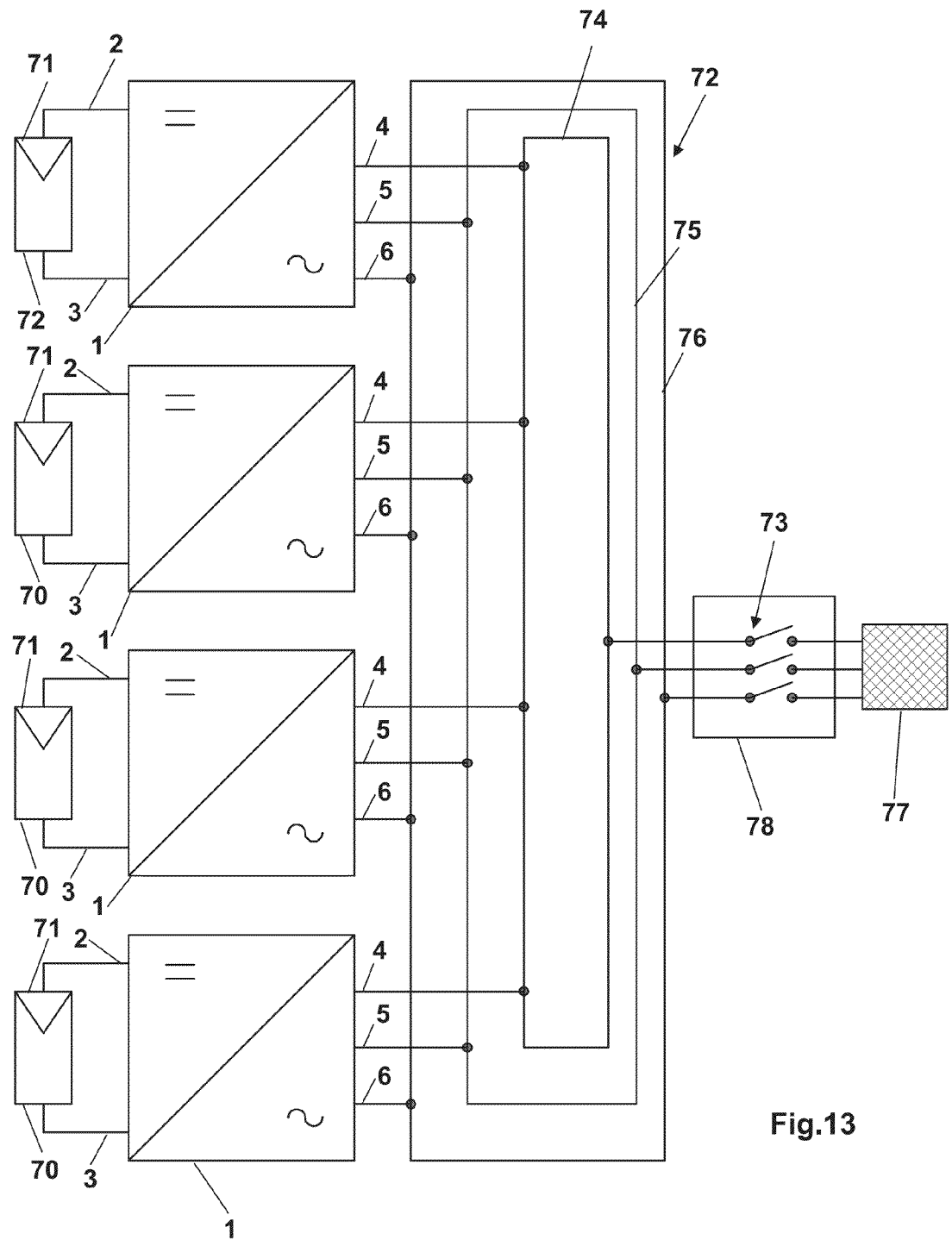
FIG. 13 shows a plurality of photovoltaic modules connected to the AC grid via a plurality of power inverters, a ring of power lines and a connector box.

FIG. 13 shows four power inverters 1, as an example for a plurality of power inverters 1, which may include much more individual power inverters 1 that each feed electric energy from a photovoltaic module 70 as a power generator 71 via a ring 72 of lines 74 to 76 and a relay 73 into the AC grid 77. All output terminals 4 of all power inverters 1 are connected to the same ring shaped power line 74, all output terminals 5 of all power inverters 1 are connected to the ring shaped power line 75, and all ground terminals 6 of all power inverters 1 are connected to the ring shaped ground line 76. The ring shape of the lines 74 to 76 has both advantages with regard to failure safety and ohmic losses. The ring 72 serves as an AC power collecting bus. The AC power collected on this bus is fed into the grid 77 via the central relay 73 that is arranged in a box 78 separately from all the individual power inverters 1. The power inverters 1 are arranged close to the photovoltaic modules 70, and may in fact be mounted to the backsides of the photovoltaic modules 70. The relay 73 is just a back-up shut-off means for the inverters 1, as each inverter may completely be shut-off by deactivating its drivers 52, 53 for its semiconductor switches 9 to 12 and as each inverter includes a galvanic separation between the AC grid 77 and the photovoltaic module 70 due to the high frequency transformer 17 and the isolation barrier 50.

Many variations and modifications may be made to the embodiments of the disclosure without departing substantially from the spirit and principles of the disclosure. All such modifications and variations are intended to be included herein within the scope of the present disclosure, as defined by the following claims.

What is claimed is:

1. A power inverter for feeding electric energy from a DC power generator into an AC grid with two power lines, comprising:
two input terminals configured to connect to the DC power generator;
two output terminals configured to connect the two power lines of the AC grid;
a resonant converter comprising:
a high frequency transformer comprising a primary winding and a secondary winding,
at least one high frequency switched semiconductor power switch that connects one end of the primary winding of the high frequency transformer to one of the input terminals and provides a current path through the primary winding to the other one of the input terminals,
a resonant series circuit comprising an inductance and a capacitance, and
a high frequency rectifier configured to rectify a current through the secondary winding of the high frequency transformer and having two output lines; and
an output converter connected between the output lines of the high frequency rectifier and the two output terminals,
wherein the resonant converter further comprises a controller that is connected to the output terminals and configured to receive a voltage signal and provide high frequency control signals for controlling the at least one semiconductor power switch of the resonant converter to sine-modulate an AC current fed into the AC grid in phase with the voltage signal.

2. The power inverter of claim 1, wherein the controller is configured to vary a repetition rate of pulses in the high frequency control signals for sine-modulating the AC current fed into the AC grid.

3. The power inverter of claim 2, wherein the controller is further configured to vary an average repetition rate of the pulses in the high frequency control signals for controlling the electric power fed from the power generator into the AC grid.

4. The power inverter of claim 1, wherein the resonant converter further comprises two half bridges connected between the input terminals, each half bridge having two high frequency switched semiconductor power switches and a center, wherein the primary winding of the high frequency transformer is connected between the centers of the two half bridges.

5. The power inverter of claim 4, wherein the controller is configured to provide the high frequency control signals for controlling the high frequency switched semiconductor power switches of the two half bridges in a way such as to either connect one end of the primary winding of the high frequency transformer to one of the input terminals and the other end of the primary winding to the other one of the input terminals, or to short-circuit the two ends of the primary winding via one high frequency switched semiconductor power switch of each of the two half bridges.

6. The power inverter of claim 5, wherein the controller is configured to provide the high frequency control signals for controlling the high frequency switched semiconductor power switches of the two half bridges in a way such as to short-circuit the two ends of the primary winding via always the same two high frequency switched semiconductor power switches.

7. The power inverter of claim 6, wherein a current path between the two ends of the primary winding through the always same two high frequency switched semiconductor power switches is configured to have essentially lower electrical losses than a current path between the two ends of the primary winding through the two other high frequency switched semiconductor power switches of the two half bridges.

8. The power inverter of claim 4, wherein the controller is configured to provide the two control signals at a time shift with partially overlapping pulses, the partially overlapping pulses in both control signals being of equal length that is at least as long as a resonance period of the resonant series circuit of the resonant converter, and wherein the controller is configured to vary the time shift between the two high frequency signals for varying the length of the on-times.

9. The power inverter of claim 8, wherein both control signals exhibit a duty cycle of about 50% independent of a repetition rate of the pulses.

10. The power inverter of claim 4, wherein the controller is configured to provide one high frequency control signal per half bridge that is directly controlling one of the two semiconductor power switches of the respective half bridge and that is inverted for controlling the other of the two semiconductor power switches of the respective half bridge.

11. The power inverter of claim 10, wherein the controller is configured to provide the high frequency control signals for zero current switching of the semiconductor power switches of the half bridges.

12. The power inverter of claim 11, wherein the controller is configured to provide the high frequency control signals for full wave mode zero current switching of the semiconductor power switches of the half bridges, wherein the controller is configured to vary a length of on-times of the primary winding, during which one of the semiconductor power switches of one of the half bridges that is connected to one of the input terminals and one of the semiconductor power switches of the other of the half bridges that is connected to the other of the input terminals are closed while the two other semiconductor power switches of the half bridges are open, in a range from about 50 of the resonance period at a maximum voltage signal to about 100% of the resonance period at a zero voltage signal.

13. The power inverter of claim 10, wherein the controller is configured to modulate the repetition rate of the pulses in the high frequency control signals and/or vary the length of the on-times according to control data stored in a look-up table depending on the voltage signal.

14. The power inverter of claim 4, wherein the controller is configured to provide the two high frequency control signals to the semiconductor power switches via two drivers each of which is provided for one of the two half bridges and closes one of the semiconductor power switches of the respective half bridge when the provided high frequency control signal is high and closes the other of the semiconductor power switches of the one half bridge, when the provided high frequency control signal is low, with the semiconductor power switches of the two half bridges that are closed by the two drivers, when both of the two high frequency control signals are high, being connected to the same input terminal.

15. The power inverter of claim 1, wherein the resonant series circuit comprises the high frequency transformer as the inductance, and two capacitors as the capacitance, the secondary winding of the high frequency transformer is connected between the two capacitors, and wherein the high frequency rectifier is connected to the capacitors.

16. The power inverter of claim 15, wherein the resonant series circuit consists of the two capacitors of equal capacitance and the high frequency transformer.

17. The power inverter of claim 1, wherein the high frequency rectifier comprises a rectifier full bridge.

18. The power inverter of claim 1, wherein the high frequency rectifier comprises a low-pass filter capacitor.

19. The power inverter of claim 1, wherein the output converter comprises a line-commutated converter commutated via the voltages applied to the output terminals.

20. The power inverter of claim 19, further comprising a ground terminal configured to connect a power grid ground line, wherein one of the input terminals is connected to one of the output lines of the high frequency rectifier via a first resistor, and to the ground terminal via a capacitor.

21. The power inverter of claim 20, further comprising a second resistor connected in parallel to the capacitor connecting the one of the input terminals.

22. The power inverter of claim 20, wherein the one of the output lines of the high frequency rectifier connected to the one of the input terminals is the output line of the high frequency rectifier that exhibits the lower electrical potential of the input terminals with regard to electric ground.

23. The power inverter of claim 22, wherein all lines crossing the isolation barrier comprise at least one of the following: a high ohmic resistor or a capacitor at the isolation barrier.

24. The power inverter of claim 1, further comprising an electrical isolation barrier between the input terminals and the output terminals, with all high frequency switched semiconductor power switches and the primary winding of the high frequency transformer being on the same side of the barrier as the input terminals, and with the resonant series circuit including the secondary winding of the high frequency transformer, the high frequency rectifier and the output converter being on the same side of the barrier as the output terminals.

25. The power inverter of claim 1, further comprising an EMC-filter comprising chokes selected from common mode chokes and hybrid choke coils connected between the output converter and the two output terminals, and a varistor connected between taps of the chokes that correspond to each other.

26. The power inverter of claim 25, wherein the chokes are hybrid choke coils that are arranged on a common ring magnetic core that has an additional web comprising an air gap in which an electrically conductive material is provided.

27. The power inverter of claim 1,
wherein the high frequency transformer provides a galvanic separation between the two input terminals and the two output lines,
wherein the output converter comprises a line-commutated converter commutated via the voltages applied to the output terminals, and
further comprising a ground terminal configured to connect to a power grid ground line,
wherein one of the input terminals is connected to one of the output lines via a first resistor, and to the ground terminal via a capacitor.

28. The power inverter of claim 27, further comprising a second resistor connected in parallel to the capacitor connecting to one of the input terminals.

29. The power inverter of claim 27, wherein the one of the output lines that is connected to the one of the input terminals is the line that exhibits the lower electrical potential with regard to electric ground.

30. The power inverter of claim 27, wherein the one of the output lines that is connected to the one of the input terminals is the output line that exhibits the higher electrical potential with regard to electric ground.

31. A method of operating a power inverter that comprises:
two input terminals configured to connect to a DC power generator;
two output terminals configured to connect to two power lines of an AC grid;
a resonant converter comprising:
a high frequency transformer comprising a primary winding and a secondary winding,
at least two high frequency switched semiconductor power switches that connect one end of the primary winding of the high frequency transformer to one of the input terminals and provide a current path through the primary winding to the other one of the input terminals, wherein each of the at least two high frequency switched semiconductor power switches is associated with a half-bridge,
a resonant series circuit comprising an inductance and a capacitance, and
a high frequency rectifier configured to rectify a current through the secondary winding of the high frequency transformer and having two output lines; and
an output converter connected between the output lines of the high frequency rectifier and the two output terminals,
wherein the resonant converter further comprises a controller that is connected to the output terminals and configured to receive a voltage signal and provide high frequency control signals for controlling the at least two semiconductor power switches of the resonant converter to sine-modulate an AC current fed into the AC grid in phase with the voltage signal, the method comprising:
generating via the controller two high frequency control signals at a time shift between the two high frequency control signals, and applying the two high frequency control signals to first semiconductor power switches of the at least two semiconductor power switches for each half-bridge of the two half bridges, wherein each first semiconductor power switch is connected to one of the two input terminals to provide for on-times during which only one of the at least two semiconductor power switches associated with each half-bridge is closed; and
generating two inverse high frequency control signals each being the inverse of one of the two high frequency control signals, and applying the two inverse high frequency control signals to second semiconductor power switches of the at least two semiconductor power switches for each half-bridge of the two half bridges, wherein each second semiconductor power switch is connected to the other of the two input terminals such that each high frequency control signal and the inverse of that control signal are applied to the respective first and second semiconductor power switches of the same half bridge; and
synchronously modulating all the high frequency control signals to sine-modulate the AC current fed into the AC grid in phase with a voltage of the AC grid.

32. The method of claim 31, further comprising varying a repetition rate of pulses in the high frequency control signals for sine-modulating the AC current fed into the AC grid.

33. The method of claim 32, further comprising varying an average repetition rate of the pulses in the high frequency control signals for controlling the electric power fed from a photovoltaic generator into the AC grid.

34. The method of claim 31, further comprising varying a length of the on-times in a range from about 50% to about 100% of a resonance period of the resonant series circuit of the resonant converter for full wave mode zero current switching of the semiconductor power switches of the half bridges.

35. The method of claim 34, wherein the length of the on-times is varied based on a present ratio of an external voltage applied to the output lines of the high frequency rectifier and a present value of a voltage that is applied to the primary winding of the high frequency transformer during the on-times.

36. The method of claim 31, wherein both control signals are generated by the controller by partially overlapping pulses with a duty cycle of about 50% independent of the repetition rate of the pulses, and wherein the time shift between the control signals is varied for varying the length of the on-times.

\* \* \* \* \*